United States Patent
Rosen et al.

(10) Patent No.: US 8,023,981 B2
(45) Date of Patent: Sep. 20, 2011

(54) METHOD AND APPARATUS FOR ADAPTIVE DYNAMIC CALL SETUP BASED ON REAL-TIME NETWORK RESOURCE AVAILABILITY

(75) Inventors: Eric C. Rosen, Solana Beach, CA (US); Harleen Gill, San Diego, CA (US); Arul Ananthanarayanan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 647 days.

(21) Appl. No.: 12/118,879

(22) Filed: May 12, 2008

(65) Prior Publication Data
US 2009/0280849 A1    Nov. 12, 2009

(51) Int. Cl.
*H04B 7/00* (2006.01)
(52) U.S. Cl. ........................................ 455/518
(58) Field of Classification Search ............... 455/518
See application file for complete search history.

(56) References Cited

U.S. PATENT DOCUMENTS

| | | | |
|---|---|---|---|
| 2005/0180368 A1* | 8/2005 | Hansen et al. | 370/338 |
| 2005/0288047 A1 | 12/2005 | Ananthyanarayanan et al. | |
| 2007/0197249 A1 | 8/2007 | Ross et al. | |
| 2008/0084878 A1 | 4/2008 | Akbar et al. | |
| 2010/0135232 A1* | 6/2010 | Fan et al. | 370/329 |

OTHER PUBLICATIONS

International Search Report, PCT/US2009/042954, International Searching Authority, European Patent Office, Aug. 19, 2009.
Written Opinion, PCT/US2009/042954, International Searching Authority, European Patent Office, Aug. 19, 2009.

* cited by examiner

*Primary Examiner* — Duc Nguyen
*Assistant Examiner* — Ankur Jain
(74) *Attorney, Agent, or Firm* — Raphael Freiwirth

(57) ABSTRACT

An apparatus and method for adaptively enabling a PTT communication with efficient resource allocation in a radio access network. After a user uses a mobile device to activate a PTT call, the mobile device checks the network condition before transmitting a PTT call origination request to a PTT server. The mobile device monitors the network condition by tracking the failure rate of prior network resource requests. If the failure rate is below a threshold, the PTT call origination request is sent to a network server before or at the same time with a quality-of-service (QoS) network resource request.

34 Claims, 5 Drawing Sheets

METHOD AND APPARATUS FOR ADAPTIVE DYNAMIC CALL SETUP BASED ON REAL-TIME NETWORK RESOURCE AVAILABILITY

BACKGROUND OF THE INVENTION

1. Field of the Invention

The invention relates to wireless communication, and more particularly, to dynamic call setup according to real-time network conditions.

2. Description of the Related Art

In wireless telecommunication systems, Push-to-talk (PTT) capabilities are becoming popular with individual groups of users as well as service sectors. PTT can support a "dispatch" voice service that operates over standard commercial wireless infrastructures, such as code division multiple access (CDMA), frequency division multiple access (FDMA), time division multiple access (TDMA), and global system for mobile communications (GSM).

FIG. 1 illustrates a prior art architecture 100 supporting PTT communications. The architecture includes the deployment of a single PTT server 112 region in conjunction with a carrier's CDMA infrastructure and packet data network. Other network servers, such as additional PTT servers, can be resident on the regional network 110. Each region of the PTT server 112 is deployed over a specific portion of a packet data network. The PTT server 112 within the region may be routing traffic between one or more Packet Data Service Nodes (PDSNs) in the carrier network. A communication device 102 that supports the PTT feature is in communication with a base station (BS) 104. Each BS 104 may be in communication with one or more base station transceiver (BTS) 114. The BSC 104 is in communication with a high speed network 106 and PTT communications received from the communication device 102 is sent through the base station 104 and the network 106 to a packet data service node (PDSN). The BS 104 provides a package control function (PCF) 105 to the communication between the PDSN and the communication device 102. The PDSN communicates with the high speed network 106 and a PTT server 112's network 108, which is connected to a PTT network 110. The PDSN forwards the PTT communications to a PTT server 112 in the PTT network 110. A radio access network (RAN) 116 includes the BSC 104 and the BTS 114.

The PTT server 112 handles PTT communications among members of a PTT group. The PTT server 112 receives a PTT communication from one member and forwards it to all members of the PTT group. The PTT communication is usually received as data packets from the network 110, and the PTT communication sent out by the PTT server 112 is also in data packet format. A packet data service node (PDSN) and a connected base station (BS) then establish through a BTS 114 a dedicated traffic channel to transmit the PTT communication to a receiving mobile client (a PTT member). In use, a user is granted the "floor" to talk to the members of his PTT group after the PTT server 112 grants his "floor" request and necessary network resources to support his PTT communication.

PTT communications are commonly used in public safety and disaster recovery scenarios in which a large number of public safety officers and rescue workers communicate among themselves through PTT communications. One of problems related to call setup for the PTT communications between a large number of users is the latency in during the call setup process. The latency may be due to resource allocation that is heavily dependent on network conditions.

Because PTT communications are commonly used in public safety and disaster recovery scenarios, as well as by other individuals and groups that desire to effect communication with minimal delays, low latency network performance during call setup is particularly important for PTT calls.

During periods of nominal operation, when system resources in wireless (or wired) network are generally available, PTT call setup procedures in a system that provides PTT call services (or other services) over a network that provides differing grades of services (Quality of Service—QoS) for distinct traffics are typically optimized to minimize latency performance. The optimization is generally based on the assumptions that requests for a certain grade or quality of service for that call will nominally succeed.

However, when the service is operated during network conditions such that requests for certain grade or quality of service for that call will typically not succeed, i.e. during period of high call volume and high resource utilization, the nominal call flow may exhibit behavior that exacerbates the resource utilization constraint. It is therefore desirous to have a system and method that gracefully adapt resource reservation requests during PTT call setups that are appropriate for current network conditions, and it is to such system and method this invention is primarily directed.

SUMMARY OF THE INVENTION

The apparatus and method described herein enables efficient request of network resources during a PTT call setup while reducing delays associated with requesting necessary QoS guarantees for the call. In one embodiment, there is provided a method for adaptively originating a push-to-talk (PTT) call request. The method includes receiving a PTT activation request from a user, checking a network utilization indicator, and transmitting a PTT call request to a remote network server according to the network utilization indicator.

In another embodiment, there is provided an apparatus for adaptively originating a push-to-talk (PTT) call request. The apparatus includes a user interface for receiving PTT call origination requests from a user, a radio interface unit for interfacing with a remote network server, a storage unit for storing a network utilization indicator, and a controller being capable of receiving a PTT activation request from a user, checking a network utilization indicator, and transmitting a PTT call request to a remote network server according to the network utilization indicator.

Other advantages and features of the present invention will become apparent after review of the hereinafter set forth Brief Description of the Drawings, Detailed Description of the Invention, and the Claims.

DETAIL DESCRIPTION OF THE INVENTION

In this description, the terms "communication device," "wireless device," "wireless communications device," "PTT communication device," "handheld device," "mobile device," and "handset" are used interchangeably. The "radio access network" and "network server" are used interchangeably. The terms "call" and "communication" are also used interchangeably, so are the terms "base station" and "base station server." The term "application" as used herein is intended to encompass executable and non-executable software files, raw data, aggregated data, patches, and other code segments. The term "exemplary" means that the disclosed element or embodiment is only an example, and does not indicate any preference of user. Further, like numerals refer to like elements throughout the several views, and the articles "a" and "the" includes plural references, unless otherwise specified in the description.

In overview, the system and method adaptively enables a communication with efficient resource allocation in a communication network. After a user used a mobile device to activate a communication, such as a PTT call origination request (or a generally a "communication origination request"), the mobile device checks the network condition before transmitting a communication origination request and a network resource request (such as, for example, a "QoS resource request") to a communication server. The request for the network resource is transmitted according to the network condition.

Network resources greatly affect quality of a PTT communication and network resource allocation is affected by many factors, among them, implementation of quality of service (QoS). QoS guarantees are important if the network capacity is limited, especially for real-time streaming multimedia applications, for example real time voice communication, since it often is delay sensitive. Many communication protocols and networks implement and do support QoS. When setting up a communication in a network that supports QoS, a QoS resource request is sent from an originating device to a network server. The network server verifies its load and determines whether the QoS resource request can be granted. If the network is congested or with heavy traffic load, the network server may deny the QoS resource request. If the traffic load on the network is not high, the network server will grant the QoS resource request and a quality PTT communication can then be setup. The mobile device tracks the real-time failure rate of the QoS resource requests, which is an indication of the network traffic condition.

Figure 1:
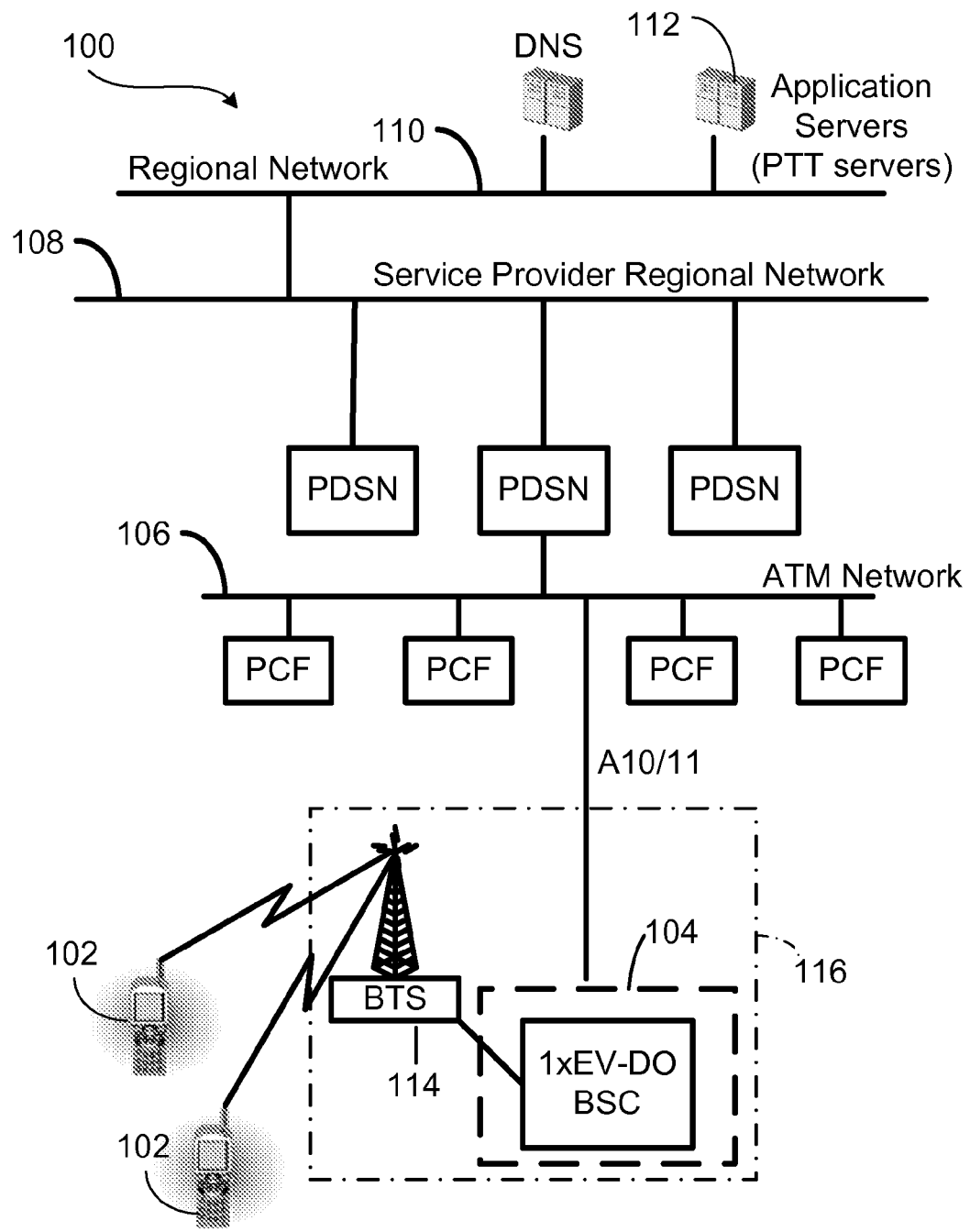
FIG. 1 is a prior art architecture of a wireless communication network.
Figure 2:
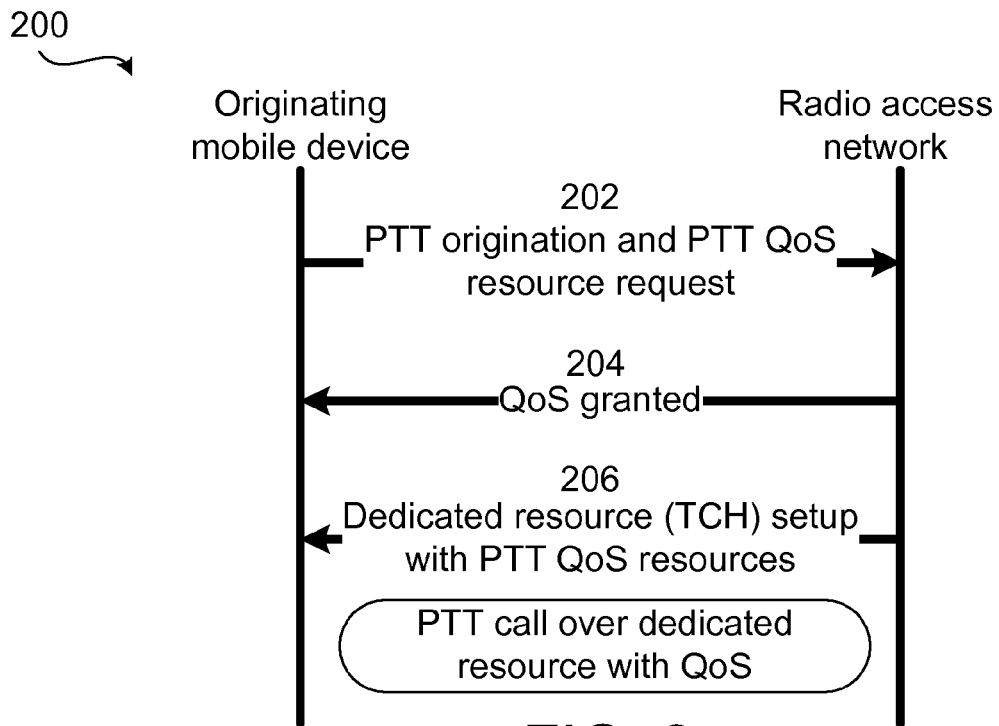
FIG. 2 is an architecture of an exemplary embodiment of a wireless communication network according to the invention.

FIG. 2 illustrates exchanges between an originating mobile device and a radio access network (RAN) when the network utilization is low. When a user wants to make a PTT call (communication), the user pushes a PTT activation button on his mobile device. In one embodiment, the mobile device checks its current status, such as if the mobile device was in a "dormant" state and not exchanging any data with the RAN through a traffic channel. After checking the current status, or alternately, after pressing the PTT activation button, the mobile device sends a PTT call origination request and a QoS resource request to the RAN (arrow 202). The PTT call origination request can be sent either before or in parallel with the QoS resource request. Since the mobile device was in the dormant state in this embodiment, the failure rate of QoS resource requests is either not tracked or not current; therefore, there is no need for the mobile device to check the failure rate of QoS resource requests. After the network server receives the QoS resource request, the network server will allocate resources necessary for the quality of service needed by the mobile device and a dedicated traffic channel will then be setup for carrying the PTT call, and can grant the QoS request (arrow 204) and dedicate the QoS resources (arrow 206).

Figure 3:
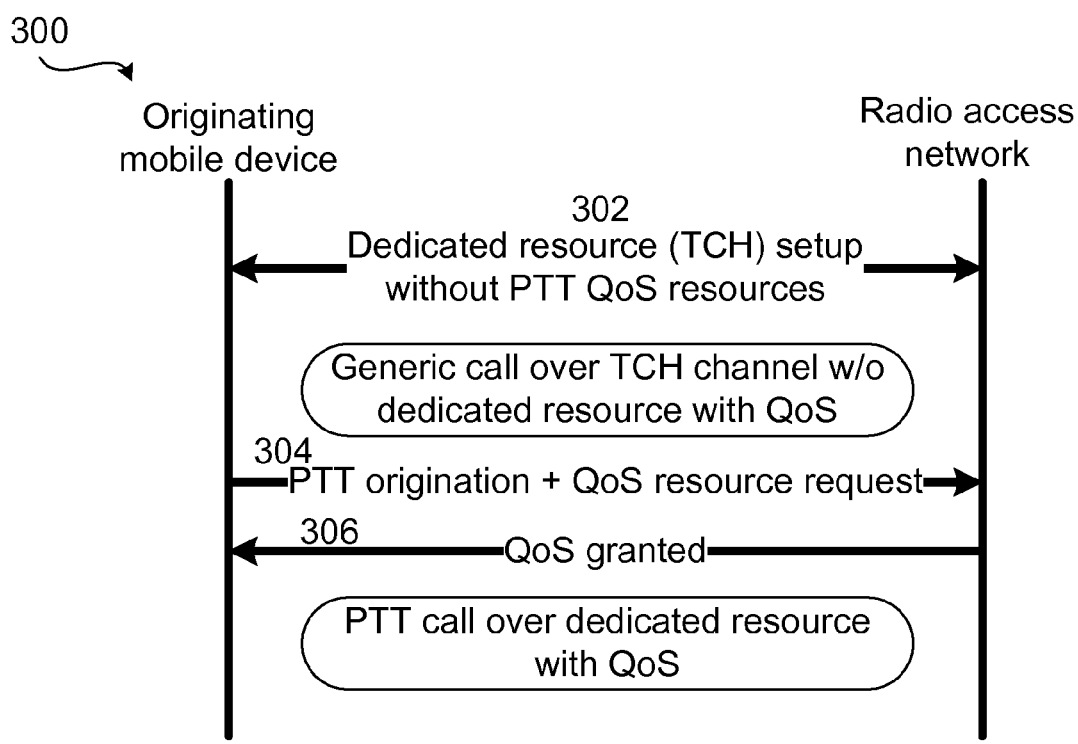
FIG. 3 a message flow chart according to an exemplary embodiment of the invention.

FIG. 3 illustrates exchanges between an originating mobile device and a radio access network (RAN) when there is a traffic channel already established between them (arrow 302) and the traffic channel has been previously set up without the QoS necessary for a PTT call. When a user wants to make a PTT call, the user pushes a PTT activation button on his mobile device. The mobile device checks its current status. If the mobile device realizes that there is some generic data call over a traffic channel and that the real-time failure rate of resource requests is less than a specific threshold, the mobile device will then send a PTT call origination request and a QoS resource request to the RAN (arrow 304). The PTT call origination request can be sent either before or in parallel with the QoS resource request. Since the real-time failure rate of resource requests is less than a threshold, it means that the network condition is likely not overloaded and the network server can handle a QoS resource request. After the network server receives the QoS resource request, the network server will allocate resources necessary for the quality of service needed by the mobile device and a dedicated traffic channel will then be set up for carrying the PTT call (QoS is granted at arrow 306).

Figure 4:
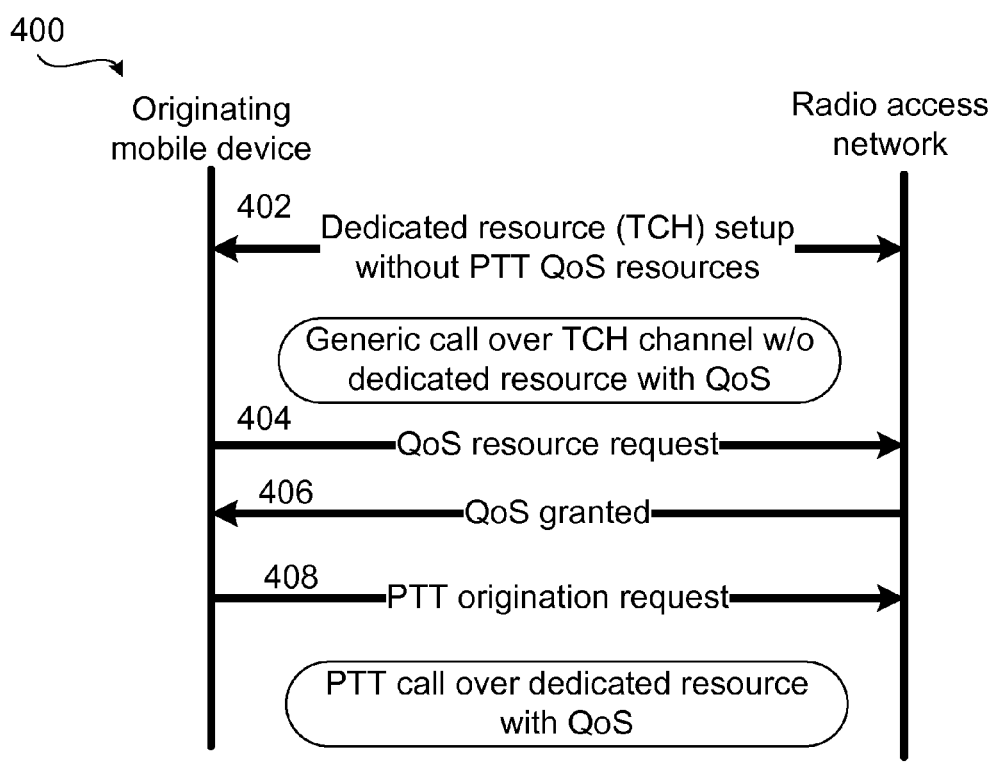
FIG. 4 illustrates a base station controller process according to an exemplary embodiment of the invention.

FIG. 4 illustrates exchanges between an originating mobile device and a radio access network (RAN) when there is a traffic channel established between them (arrow 402) and the network condition is busy. When a user wants to make a PTT call, the user pushes a PTT activation button on his mobile device. The mobile device checks its current status. If the mobile device realizes that there is some generic data call over a traffic channel and that the real-time failure rate of resource requests exceeds a predefined threshold, the mobile device will then send a QoS resource request to the RAN (arrow 404). Since the real-time failure rate of resource requests exceeds the threshold, it means that the network condition is likely to be busy. By sending a QoS resource request first, the mobile device wants to ensure that there is resource available for its PTT call. If the resource request is not granted, then the mobile device will not send the PTT call origination request to the network server. If a QoS resource request grant is received (arrow 406), then mobile device sends the PTT call origination request to the network server (arrow 408). After the PTT call origination request is acknowledged by the network server, a traffic channel will be established for the PTT call.

Alternatively, the mobile device may send both QoS resource request and PTT call origination request sequentially to the network server. The network server may grant the PTT call origination request but deny the QoS resource request if the network condition is busy. However, since both requests must be granted to have a quality PTT call and if one of the requests is denied, the mobile device may not have the traffic channel with QoS and the PTT call will not be established.

Figure 5:
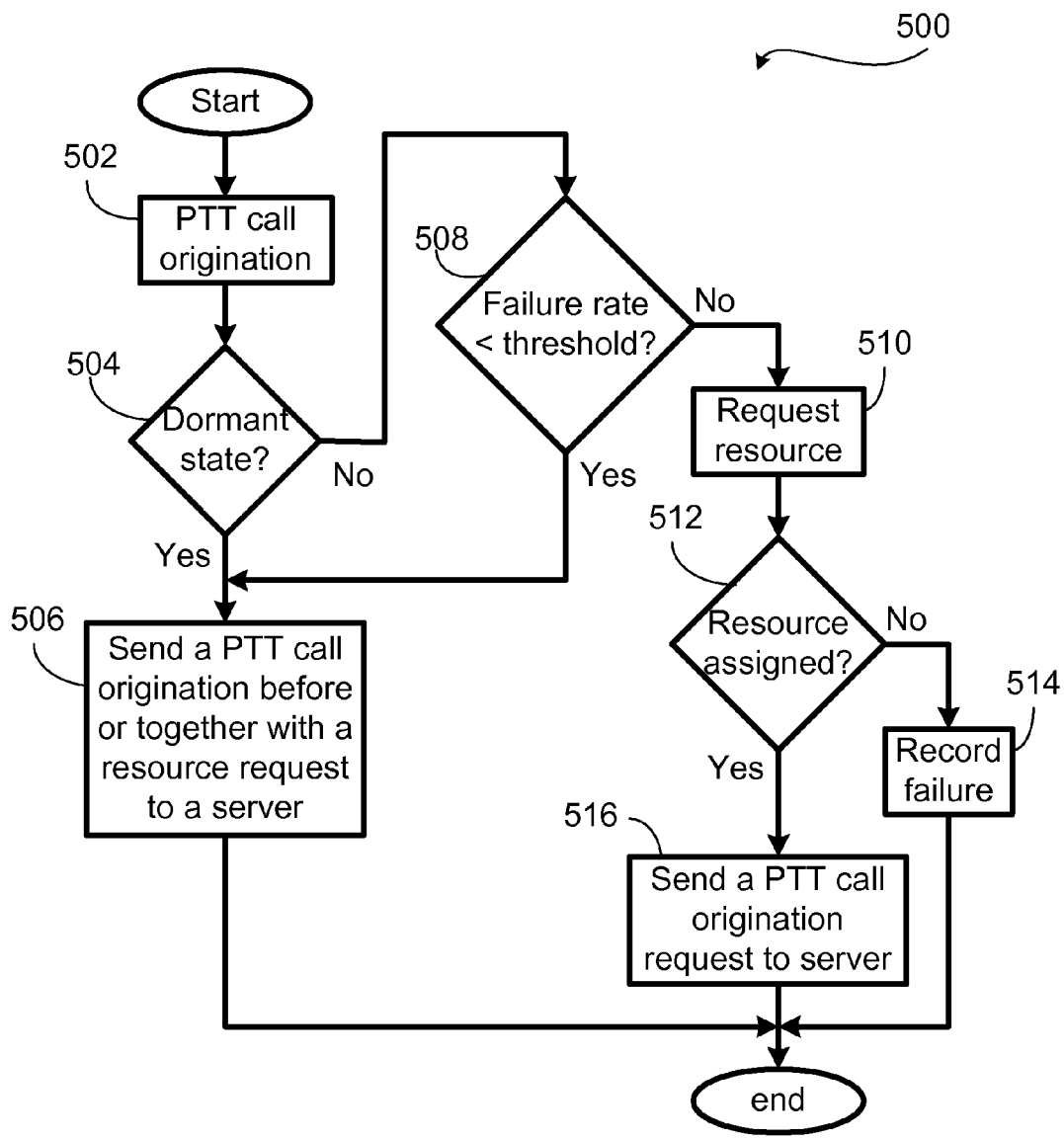
FIG. 5 illustrates a PDSN process according to an exemplary embodiment of the invention.

FIG. 5 illustrates a flow chart of a mobile device process 500. When a user activates a PTT call button to originate a PTT call, step 502, the mobile device checks if it is in a dormant state, step 504. If the mobile device is in a dormant state, i.e., there is not data traffic between the mobile device and a network server, then the mobile device sends a PTT call origination request and a QoS resource request to the network server, step 506. The PTT call origination request can be sent in parallel or before the QoS resource request. After the network server grants the QoS resource request and the traffic channel is set up, the PTT call can then be conducted over the traffic channel.

If the mobile device is not in the dormant state, then the mobile device checks the failure rate of recent QoS resource requests, step 508. If the network condition is not congested, i.e., the failure rate of recent QoS resource requests is less than a predefined threshold, then the mobile device sends the PTT call origination request in parallel or before the QoS resource request, step 506. If the network is busy, i.e., the real-time failure rate of recent QoS resource requests is more than a predefined threshold, then the mobile device will attempt to reserve the resource first, step 510, such as a making a network resource request for channel allocation to make a PTT communication. If a failure message is received for the network resource request and the resource is not granted, the mobile device will record the failure, step 514. If the resource is granted, the mobile device then sends a PTT call origination request to the network server, step 516. After the network server acknowledges the PTT call origination request and establishes a traffic channel between the network server and the mobile device, the PTT call can then be conducted over the RAN.

Figure 6:
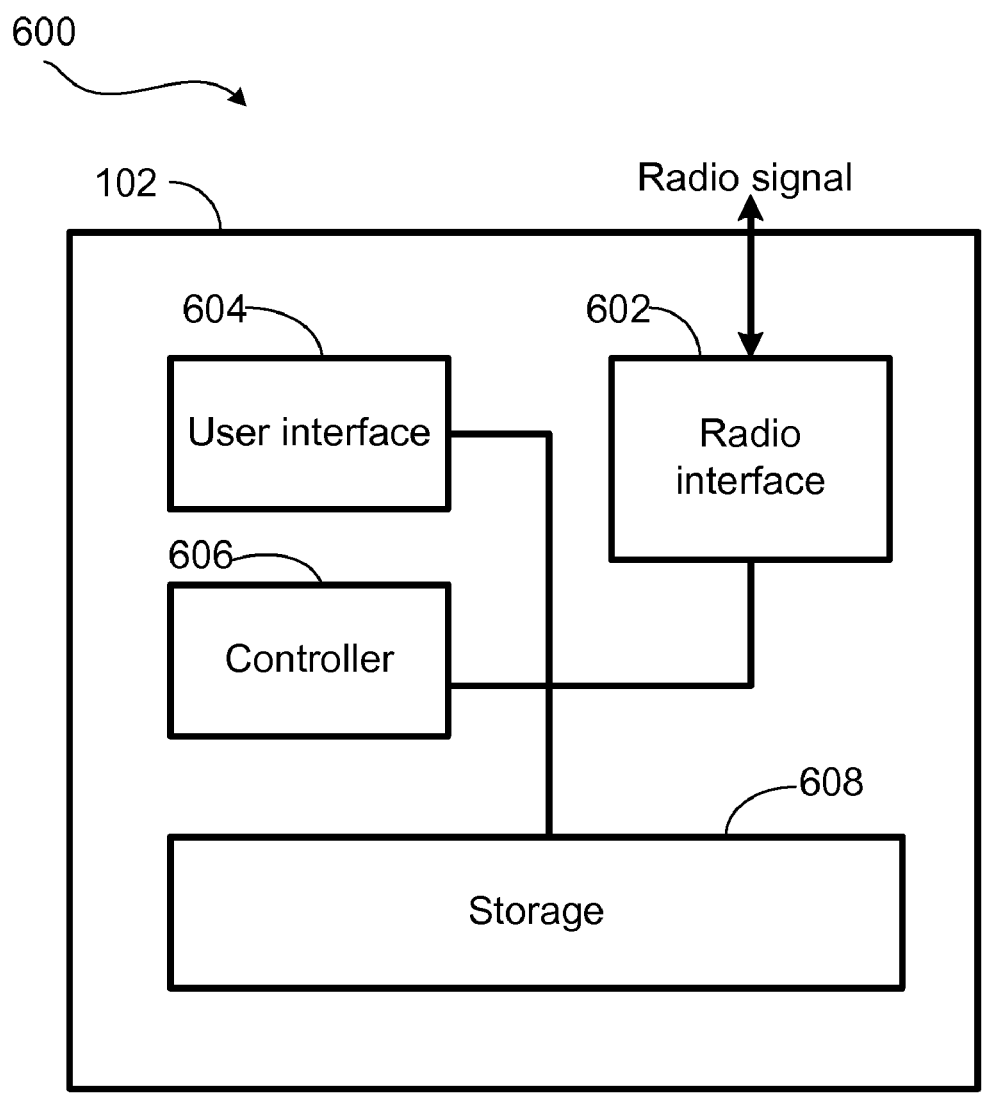
FIG. 6 is a block diagram for an exemplary embodiment of a base station controller supporting the present system.

FIG. 6 depicts architecture 600 of a mobile device 102 capable of supporting the PTT call origination scenario described above. The mobile device 102 has a user interface unit 604 for interfacing with a user. The user interface unit 604 controls user interface units, such as keypad, speaker, microphone, and PTT activation button. The mobile device 102 also includes a radio interface unit 602, a controller 606, and a storage unit 608. The radio interface unit 602 communicates with the network server through the RAN. The controller 606 tracks the network usage by tracking the failure rate of network resource requests. The storage unit 608 stores the failure rate of the network resource requests and the state of the mobile device 102. The state of the mobile device 102 is reflected by several factors, such as whether a traffic channel is established between the mobile device 102 and the network server and whether there is any media or data communication between the network server and the mobile device 102.

In operation, when a foreman at a construction site wants to use his mobile device to communicate with his crew, the foreman activates the PTT button on the mobile device. It is assumed here that the foreman has been communicating through PTT calls with his crew several times prior to this call and the mobile device was exchanging data with the network server. The mobile device verifies that it is not in an idle state and that there is a data channel established between the mobile device and the network server. The data channel is for data exchange and is not established with QoS, or with QoS that is insufficient for a PTT call. The mobile device then checks the failure rate in its storage unit. If the failure rate is high, it means that the network is busy. If the failure rate is low, it means that the network is not overloaded. Assuming that the failure rate is higher than a predefined threshold value, the mobile device interprets it as the network being busy, and the mobile device then sends first a QoS resource request to the network server. The mobile device waits for the network server to reserve the network resource capable of supporting a QoS call. After receiving a QoS grant, the mobile device then sends a PTT call origination request to start the PTT call. If the QoS grant is not received from the network server, the mobile device will not send out the PTT call origination request. Alternatively, the network server may reserve less than a desired network resource for the mobile device and then sends a QoS grant to the mobile device. In this case, the mobile device will be able to conduct the PTT call with less quality that it originally requested. Conducting PTT calls with less than desired qualities may be acceptable for emergency rescue workers such as firemen or police when the ability to communicate is more important than the quality of communication.

Although the invention is described above in a PTT environment, the invention is not limited to PTT communications. In a broader sense, the system and methods optimize network resource utilization for communications that utilize QoS. In view of the method being executable on a mobile device, the method can be performed by a program resident in a computer readable medium, where the program directs the mobile device or other computer device having a computer platform to perform the steps of the method. The computer readable medium can be the memory of the server, or can be in a connective database. Further, the computer readable medium can be in a secondary storage media that is loadable onto a wireless communications device computer platform, such as a magnetic disk or tape, optical disk, hard disk, flash memory, or other storage media as is known in the art.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the invention has been particularly shown and described with reference to a preferred embodiment thereof, it will be understood by those skilled in the art that various changes in form and detail may be made without departing from the scope of the present invention as set forth in the following claims. For example, the description above is based on an audio PTT communication, it is understood the apparatus, system, and method can be easily modified to support other type of media, such as video, data, etc. Furthermore, although elements of the invention may be described or claimed in the singular, the plural is contemplated unless limitation to the singular is explicitly stated.

What is claimed is:

1. A method for adaptively originating a communication over a communication network, comprising:
   receiving, from a user at an originating mobile device, a communication activation request that requests set-up of a communication session;

checking, responsive to the received communication activation request, a network utilization indicator;

transmitting, to a remote server, a network resource request configured to request network resources for the communication session; and determining whether to transmit a communication origination request to request set-up of the communication session by the remote server in conjunction with the network resource request based upon a rule in accordance with the network utilization indicator; wherein the determining step includes:

verifying, prior to the transmitting step, whether a data channel is already established to the remote server;

if a data channel is verified as already established to the remote server, verifying that the data channel is not established with a network resource allocation exceeding a given level; and if the data channel is verified as not established with a network resource allocation exceeding a given level, checking the network utilization indicator.

2. The method of claim 1, wherein if the determining step determines to transmit the communication origination request in conjunction with the network resource request if the network utilization indicator is less than a threshold value and there is an established traffic channel to the remote server.

3. The method of claim 1, wherein the determining step determines to transmit the network resource request before the communication origination request if network utilization threshold is not less than a threshold value.

4. The method of claim 1, wherein the determining step determines to transmit the communication origination request in conjunction with or before the network resource request if there is not an established traffic channel to the remote server and the network utilization indicator is not current.

5. The method of claim 1, wherein the network utilization indicator indicates a real-time failure rate of network resource requests.

6. The method of claim 1, wherein the network utilization indicator indicates whether a traffic channel has been established to the remote server.

7. The method of claim 1, further comprising receiving a network resource grant indicator from the remote server.

8. The method of claim 1, further comprising:

receiving a failure message for the network resource request; and recording a failure into a failure rate, based on the failure message.

9. The method of claim 1, wherein the communication origination request is a push-to-talk (PTT) call origination request.

10. The method of claim 9, wherein the network resource request is a Quality of Service (QoS) request for a given QoS resource reservation.

11. The method of claim 1, wherein the communication session corresponds to a group communication session.

12. The method of claim 11, wherein the network resource request is a Quality of Service (QoS) request for a given QoS value.

13. The method of claim 12, wherein checking the network utilization indicator includes checking a failure rate of communication origination requests previously transmitted on the data channel.

14. The method of claim 13, wherein if the failure rate exceeds a given threshold the determining step determines to wait for receipt of a grant from the remote server of the requested network resource, and wherein the communication origination request is transmitted to the remote server in response to an indication that the requested network resources are granted.

15. An apparatus for adaptively originating a communication over a communication network, comprising:

a user interface;

a radio interface unit for interfacing with a remote server;

a storage unit for storing a network utilization indicator; and a controller configured to receive from the user interface a communication activation request from a user that requests set-up of a communication session, check, responsive to the received communication activation request, a network utilization indicator, transmit, to a remote server, a network resource request configured to request network resources for the communication session, and determine whether to transmit a communication origination request to request set-up of the communication session by the remote server in conjunction with the network resource request based upon a rule in accordance with the network utilization indicator; wherein the determining step includes:

verifying, prior to the transmitting step, whether a data channel is already established to the remote server;

if a data channel is verified as already established to the remote server, verifying that the data channel is not established with a network resource allocation exceeding a given level; and if the data channel is verified as not established with a network resource allocation exceeding a given level, checking the network utilization indicator.

16. The apparatus of claim 15, wherein the controller is further configured to transmit the communication origination request in conjunction with the network resource request if the network utilization indicator is less than a threshold value and there is an established traffic channel to the remote server.

17. The apparatus of claim 15, wherein the controller is further configured to determine to transmit the network resource request before the communication origination request if network utilization threshold is not less than a threshold value.

18. The apparatus of claim 15, wherein the controller is further configured to determine to transmit the communication origination request in conjunction with or before the network resource request if there is not an established traffic channel to the remote server and the network utilization indicator is not current.

19. The apparatus of claim 15, wherein the network utilization indicator indicates a real-time failure rate of network resource requests.

20. The apparatus of claim 15, wherein the network utilization indicator indicates whether a traffic channel has been established to the remote server.

21. The apparatus of claim 15, wherein the controller is further configured for receiving a network resource grant indicator from the remote server.

22. The apparatus of claim 15, wherein the controller is further configured for receiving a failure message for the network resource request, and recording failure into a failure rate.

23. A non-transitory computer readable medium containing instructions stored thereon, which, when executed by an apparatus, cause the apparatus to perform actions, the instructions comprising:
- a set of instructions to receive, from a user of the apparatus, a communication activation request that requests set-up of a communication session;
- a set of instructions to check, responsive to the received communication activation request, a network utilization indicator;
- a set of instructions to transmit, to a remote server, a network resource request configured to request network resources for the communication session; and
- determining whether to transmit a communication origination request to request set-up of the communication session by the remote server in conjunction with the network resource request based upon a rule in accordance with the network utilization indicator; wherein the determining step includes:
- verifying, prior to the transmitting step, whether a data channel is already established to the remote server;
- if a data channel is verified as already established to the remote server, verifying that the data channel is not established with a network resource allocation exceeding a given level; and
- if the data channel is verified as not established with a network resource allocation exceeding a given level, checking the network utilization indicator.

24. The non-transitory computer-readable medium of claim 23, wherein the set of instructions to determine determines to transmit the communication origination request in conjunction with the network resource request if the network utilization indicator is less than a threshold value and there is an established traffic channel to the remote server.

25. The non-transitory computer-readable medium of claim 23, wherein the set of instructions to determine determines to transmit the network resource request before the communication origination request if network utilization threshold is not less than a threshold value.

26. The non-transitory computer-readable medium of claim 23, wherein the set of instructions to determine determines to transmit the communication origination request in conjunction or before the network resource request if there is not an established traffic channel to the remote server and the network utilization indicator is not current.

27. An apparatus for adaptively originating a communication over a communication network, comprising:
- means for receiving a communication activation request a user that requests set-up of a communication session;
- means for interfacing with a remote server;
- means for storing a network utilization indicator; and
- controller means for:
  - checking, responsive to the received communication activation request a network utilization indicator,
  - transmitting, to a remote server, a network resource request configured to request network resources for the communication session, and
  - determining whether to transmit a communication origination request to request set-up of the communication session by the remote server in conjunction with the network resource request based upon a rule in accordance with the network utilization indicator; wherein the determining step includes:
- verifying, prior to the transmitting step, whether a data channel is already established to the remote server;
- if a data channel is verified as already established to the remote server, verifying that the data channel is not established with a network resource allocation exceeding a given level; and
- if the data channel is verified as not established with a network resource allocation exceeding a given level, checking the network utilization indicator.

28. The apparatus of claim 27, wherein the controller means is further configured to transmit the communication origination request in conjunction with the network resource request if the network utilization indicator is less than a threshold value and there is an established traffic channel to the remote server.

29. The apparatus of claim 27, wherein the controller means is further configured to determine to transmit the network resource request before the communication origination request if network utilization threshold is not less than a threshold value.

30. The apparatus of claim 27, wherein the controller means is further configured to determine to transmit the communication origination request in conjunction with or before the network resource request if there is not an established traffic channel to the remote server and the network utilization indicator is not current.

31. The apparatus of claim 27, wherein the network utilization indicator indicates a real-time failure rate of network resource requests.

32. The apparatus of claim 27, wherein the network utilization indicator indicates whether a traffic channel has been established to the remote server.

33. The apparatus of claim 27, wherein the controller means is further for receiving a network resource grant indicator from the remote server.

34. The apparatus of claim 27, wherein the controller means is further for:
- receiving a failure message for the network resource request; and
- recording failure into a failure rate.

* * * * *